United States Patent Office 3,549,979
Patented Dec. 22, 1970

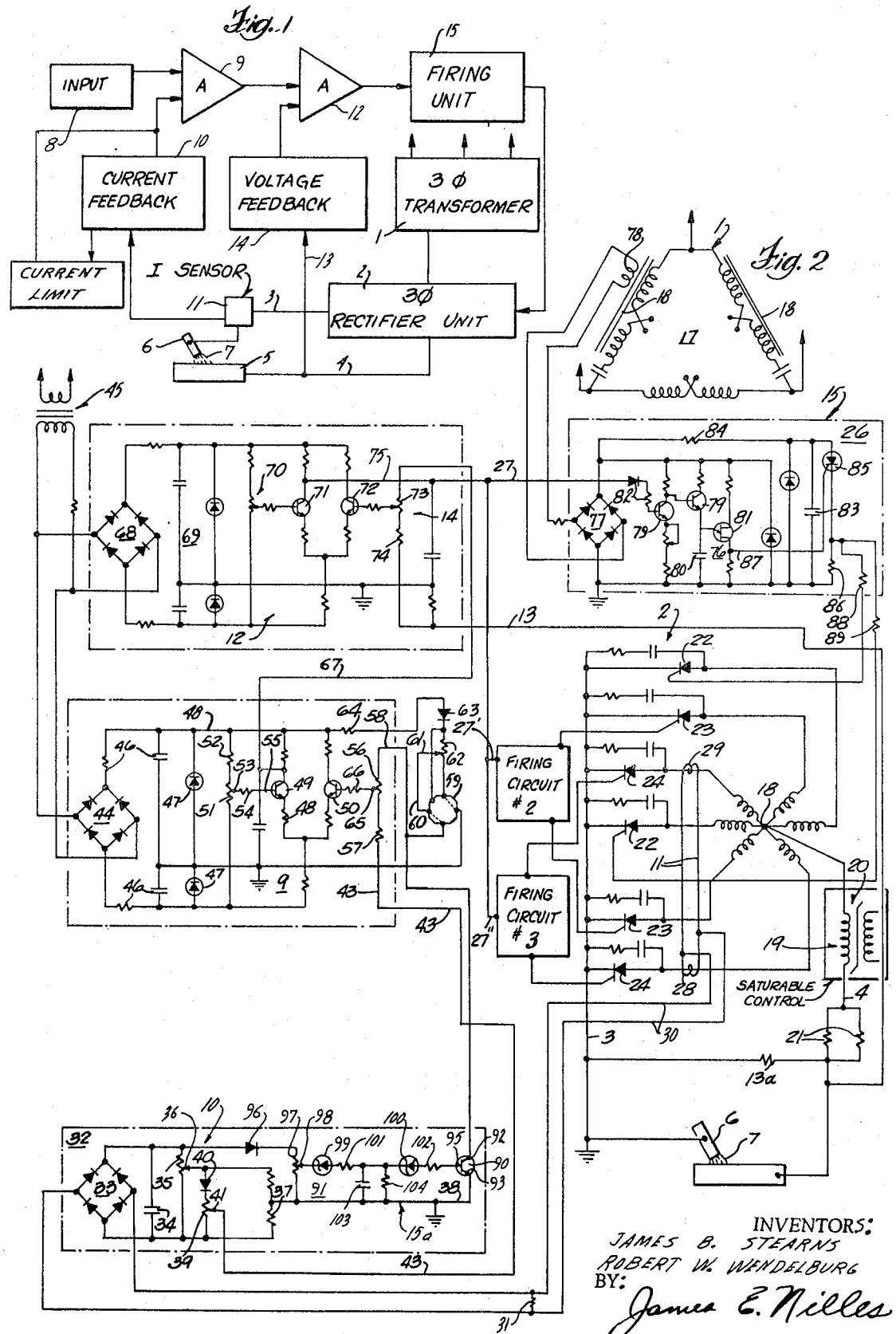

1

3,549,979
ARC POWER SUPPLY WITH CURRENT
LEVEL CONTROL
James B. Stearns, Elm Grove, and Robert W. Wendelburg,
Milwaukee, Wis., assignors to Chemetron Corporation,
Chicago, Ill., a corporation of Delaware
Filed Apr. 25, 1969, Ser. No. 819,205
Int. Cl. B23k 9/10; H02m 7/20
U.S. Cl. 321—19                                11 Claims

ABSTRACT OF THE DISCLOSURE

An arc welding supply having a three phase transformer and full wave rectifier including controlled rectifiers. A feedback control system includes a pair of separate and cascaded summing differential amplifiers. The first amplifier is interconnected to sum the set voltage input signal and a current feedback signal. The second amplifier is connected to sum the output of the first amplifier and the voltage feedback signal. An overload current transistor is connected to ground the first summing amplifier if the arc current rises above a selected level. The transistor is connected to the current feedback signal by a Zener diode network including a time delay capacitor.

BACKGROUND OF THE INVENTION

The invention reates to an arc supply having current level control and particularly a current limit control to prevent maintaining of abnormal high level arc current.

Direct current power supplies for establishing and maintaining an arc such as a welding arc between a pair of electrodes may be of a motor-generator or a transformer-rectifier construction. Transformer-rectifier units have recently been developed employing triggered solid state elements such as a silicon controlled rectifier. An unusually satisfactory arc welding power supply of this character is disclosed in U.S. Pat. 3,337,769 to J. Buchanan and more particularly in applicant's co-pending application entitled, "Direct Current Arc Power Supply With Stabilized Feedback Control," Ser. No. 819,204 which was filed on Apr. 25, 1969, the same day as this application and is assigned to the same assignee, and more fully disclosed in the above application. The firing of the controlled rectifiers in the latter application includes an adjustable current feedback signal amplifier to control the slope characteristic and connected as an input to a separate voltage feedback signal amplifier to maintain a desired constant voltage output.

Although the above circuits provide a highly acceptable, commercially practical, arc welding power source for most welding, the circuits may be damaged by abnormal high level arc current levels. Current responsive means may be provided to control the main contactors and thereby provide the necessary protection. However, this requires the welder to manually reset the contactors and again attempt to weld to determine whether the fault was temporary or required machine service.

SUMMARY OF THE INVENTION

The present invention is particularly directed to an improved arc power supply having an automatic resetting current level control responsive to selected abnormal arc currents. Generally, in accordance with the present invention, the feedback control system of the above disclosure is employed and includes a pair of separate and cascaded summing circuits, the first of which is interconnected to sum the set voltage input and a current feedback signal, and the second of which is connected to sum the output of the first summing network and the voltage reference feedback signal. The output of the second summing network is interconnected to control several firing networks for the triggered full wave rectifying circuit. The current feedback network of the present invention includes a resettable disable circuit responsive to the current feedback signal to actuate the firing networks for establishing a minimum output. The disable circuit includes a time delay means to avoid actuation in response to transient signals such as may occur at the initiation of a welding arc. The disable circuit automatically resets on removal of the fault current condition.

In a particularly novel feature of the present invention, a transistor is connected to the feedback signal side of a summing resistor, which provides the input to first summing circuit, and ground. The input to the transistor is interconnected to the rectified feedback signal through a timing network preferably a Zener diode network. If the voltage rises above a certain level, the Zener network breaks down and after a predetermined time period, triggers the transistor to ground the current feedback side of the summing resistor which results in phasing back of the trigger circuit for the main control trigger elements to a minimum firing angle. In an unusually satisfactory and novel circuit, a pair of series connected Zener diodes interconnects the input loop of the transistor to the current feedback signal. A resistance capacitor timing network is interconnected between the two Zener diodes. Thus, the output current must rise above the level of the first Zener diode before it will start to energize or charge the timing network. Furthermore, such overcurrent must exist for a selected time period before the timing circuit is charged to a level to break over the second Zener diode and provide an input signal to the shorting transistor. The time delay is highly desirable in that it eliminates the phasing back of the system in response to momentary high transient currents for example, which are always encountered during the initial start up of the system.

BRIEF DESCRIPTION OF THE DRAWINGS

FIG. 1 is a block diagram of the power supply and control circuitry for an arc welding system constructed in accordance with the present invention; and FIG. 2 is a schematic circuit diagram illustrating the preferred construction of the present invention shown in FIG. 1.

DESCRIPTION OF THE PREFERRED
EMBODIMENT

Referring to the drawing and particularly to FIG. 1, the illustrated embodiment of the invention includes a polyphase welding transformer 1 providing an alternating current input to a full wave polyphase rectifier unit 2. A pair of output leads 3 and 4 are connected to the rectifier with the lead 3 shown as a positive lead and the lead 4 as a negative lead. In the illustrated embodiment of the invention, the negative lead is connected to a work member 5 and the positive lead 3 is connected to an electrode 6. When the power supply is energized, an arc 7 is established and maintained between the electrode 6 and the work member 5. For proper arc welding, the voltage across the electrode and the work member 5 is preset and maintained at an essentially constant arc voltage. A reference voltage input 8 is connected to one side of a current feedback summing amplifier 9. The second input of the amplifier 9 is connected via a current feedback unit 10 to a current sensing unit 11 connected to establish a signal proportional to the current through load line 3. The output of the summing amplifier 9 is connected as a first input to a voltage feedback summing amplifier 12. The second input of the amplifier 12 is connected to voltage signal leads 13 connected across the leads 3 and 4, and particularly a load resistor 13a via a voltage feedback network 14. The output of the amplifier 12 is therefore, a modified voltage signal related to the slope characteristic established by the current feedback and in turn modified by the desired constant voltage characteristics. The output of the amplifier 12 is connected to a firing unit 15 which is adapted and interconnected to the rectifier unit 2 to produce properly timed spaced firing pulses to the bank of triggered rectifiers, which are subsequently described, for proper phasing of the rectifier network to establish and maintain the desired voltage across the electrodes 6 in the work 5 and therefore across arc 7.

The present invention includes a current level control unit 15a connected to the current feedback 10 and to the summing amplifier 9 to respond to abnormal arc current and phase back the firing unit 15 to limit the arc current.

The level control unit 15a includes a timing means to delay the response and thereby avoid triggering on transient type signals such as may occur during initiation of arc 7. The control unit 15a is also an electronic unit having an automatic resetting of the system for convenience of continued welding if the fault condition is self-correcting.

A preferred construction of one embodiment of the circuitry is shown in FIG. 2.

Referring particularly to FIG. 2, the transformer 1 is illustrated as a three prase transformer having a six phase star secondary 16 and coupled to a three phase delta-connected primary 17. The windings of the primary and secondary are suitably coupled on a common core 18 to establish a constant potential transformer for establishing a similar output at leads 3 and 4.

The common or star point of the secondary 16 is connected in series with a control winding 19 of a saturable reactor control unit 20 and a pair of paralleled slope control resistors 21 to the work 5. The saturable reactor control unit 20 provides variable inductance in series with the welding arc 7, particularly for short arc welding characteristics.

The outer end of each phase winding of the secondary 16 is similarly connected to the lead 3 in series with a silicon controlled rectifier. The diametrically opposite phase windings of the star connected secondary are connected by simultaneously conducting controlled rectifiers. Thus, one phase is connected by a pair of controlled rectifiers 22 to the line 3, an adjacent phase is connected by a similar pair of rectifiers 23 and the final phase pair are connected by a final pair of rectifiers 24. Each pair of controlled rectifiers 22–24 is connected to the firing circuit for simultaneous pulsing, with the three pairs being pulsed in proper sequence. Thus, the portion of the half-wave of each winding applied across the leads 3 and 4 is controlled by the phased firing of the related control rectifiers 22 through 24.

The paired rectifiers are connected to corresponding firing circuits of which the circuit 26 for rectifiers 22 is shown in detail. The other firing circuits for rectifiers 23 and 24 are similarly constructed and consequently are shown in appropriately labeled blocks. The firing circuit 26 is energized via an input line 27 connected to the output of amplifier 12 as shown in FIG. 1. The signal at line 27 determines the particular time in each half cycle of the related phase voltage applied to rectifiers 22 at which a firing pulse is applied to the rectifiers 22 and thereby determines the particular time in the phase that the related rectifier 22 conducts the output of the related secondary. As hereinafter described, the power input to the firing circuit 26 is synchronized with the voltage applied to the rectifiers 22. This input is further modified by the input signal at line 27 which reflects the current feedback network 10 and the voltage feedback network 14 through summation in amplifier 9 and 12 to establish a desired constant output voltage having a predetermined slope.

In FIG. 2, the current sensing unit 11 includes a pair of windings 28 and 29 coupled to the leads from the phase winding to the anodes of rectifiers 24. The windings are connected in parallel with the output leads 30 connected to the current feedback network 10. A current feedback resistor 31 is shown connected across the leads 30. The current feedback network 10 includes a separate slope circuit 32, the output of which is interconnected into the summing amplifier 9.

The illustrated slope circuit 32 includes a full wave bridge diode rectifier 33 connected across the leads 30 and establishing a pulsating direct current related to the current in the leads of rectifiers 24 and thus, in lead 3. The output of the rectifier 33 is filtered by a parallel capacitor 34 to form a filtered direct current signal which is impressed across a potentiometer 35 having a tap 36. The potentiometer 35 further defines a voltage divider for reducing or adjusting the feedback signal for differences in current transformer outputs for a given input as a result of manufacturing differences and the like, such that proper maximum slope can be achieved. The tap 36 of the potentiometer and the common end of the potentiometer 35 are connected across a further voltage dividing network consisting of a pair of series connected resistors 37. The common junction of the resistors 37 is connected to a line 38 which defines a common return or ground line for the control circuit. For purposes of simplicity of illustration, the several ground connections are shown by a conventional ground symbol. In an actual construction, the several grounded terminals are interconnected by suitable conductor or conductors.

A current pick-off circuit is connected in parallel with the voltage dividing resistors 37 and includes a first potentiometer 39 in series with a diode 40. The tap 41 of the potentiometer 39 thus provides a DC signal proportional to the current feedback signal at a current feedback line 42 connected to the amplifier 9.

The combination of the adjustable potentiometer 39 in parallel with the voltage dividing network 37 permits both negative and positive feedback with respect to the common ground line 38. When the tap or slider 41 is toward the bottom side of the potentiometer 39 in FIG. 2, a negative feedback signal is fed to the summing amplifier 9. As the slider 39 is moved upwardly, a voltage is established at some point which is essentially at zero with respect to the common ground line 38 and a corresponding zero current feedback signal is established. Movement of the slider 39 above that point creates a positive current feedback signal at line 43. This system is of particular significance in a welding power supply employing the series resistance 21 or any other similar load lead element which creates a natural slope in the output circuit and permits adjustment for optimum welding characteristics.

The illustrated current feedback amplifier 9 includes a full wave bridge rectifier 44 connected to one phase of the incoming power lines via a suitable transformer 45 to provide a DC bias supply. The output of the rectifier 44 is filtered by a suitable resistor-capacitor network 46 including a pair of series connected Zener diodes 47 connected directly across the filtered circuit. The junction of the Zener diodes 47 is grounded to define the common return line for the system. The networks 46 and Zener diodes provide a regulated positive voltage, for example 18 volts at the upper line 48, suitable for operating of the amplifier. The amplifier proper is a differential transistor amplifier including a pair of NPN transistors 49 and 50 parallel connected across the Zener diodes 47, in a well known differential amplifying circuit. A voltage dividing network including a potentiometer 51 in series with a dropping resistor 52 is connected across the Zener diodes 47. The slider or tap 53 of potentiometer 51 is connected in series with the resistor 54 to the base 55 of transistor 49 producing a bias circuit tending to turn on the transistor 49 and establish an output signal at its collector. The opposite or second transistor 50 of the differential amplifier is connected to be energized from a summing resistor or potentiometer 56, the one side of which is connected via resistor 57 to the current feedback line 43. The opposite side of the summing resistor 56 is connected via a lead 58 to a remote voltage receptacle 59. The internal receptacle connections are shown by dotted line connections within the receptacle 59. Thus, the lead 58 is connected to a lead 60 by the receptacle 59. The lead 60 is in turn connected to a potentiometer slider or tap 61 of an input voltage adjustment potentiometer 62 defining the input control 8 of FIG. 1. The potentiometer 62 has a one side connected in series with a diode 63 and a common dropping resistor 64 to the positive side or line 48 of the regulated voltage output of the rectifier 44. The opposite side of potentiometer 62 is connected through the receptacle 59 to the common ground.

Thus, in the operation of the system, the potentiometer 51 is set to establish a predetermined bias on the transistor 49. The potentiometer 62 is set to establish a predetermined voltage, related to a desired output voltage, to the one side of the summing resistor 56. The voltage on the other side is determined by the current feedback circuit and particularly the voltage of line 42. A potentiometer tap 65 of the potentiometer 56 connects the voltage through a limiting resistor 66 to the base of the transistor 50. Thus, the voltage applied to the transistor 50 is proportional to the summation of the reference or preset voltage established by potentiometer 62 less the voltage appearing at line 42. The output of the differential amplifier 9 which appears at a lead 67 connected to the collector of transistor 49 is therefore, directly proportional to the summation of the reference input voltage and the current feedback voltage.

The current feedback modified signal appearing at line 67 is applied to the voltage feedback network and particularly amplifier 12.

The voltage feedback system generally is similar to that of the current feedback system and includes the differential transistor amplifier including a pair of transistors connected to a regulated DC supply including a full wave bridge diode rectifier 68 connected across the output of transformer 45 and a regulating network 69. A voltage dividing potentiometer 70 is similarly connected to one transistor 71 of the differential amplifier and biases transistor 71 to conduct. The opposite transistor 72 of the differential amplifier is connected in a bias network to a summing resistor 73, the one side of which is connected to the current feedback line 67 and the opposite side of which is connected via a resistor 74 to the voltage feedback line 13. The output of the differential amplifier is taken off the collector of the transistor 71 via a line 75 which is connected in common to the input lines 27, 27' and 27" for the several firing circuits 26.

The illustrated firing circuits employ a unijunction pulsing circuit 76 having a full wave bridge rectifier 77 connected to a corresponding phase through a phase winding 78 which is wound on a corresponding phase of the primary 17 of transformer 1 similar to the system shown in the Buchanan Pat. 3,337,769. The output of the rectifier 77 is not filtered and provides an in-phase charging current to the unijunction pulsing circuit 76 which includes a two stage amplifier including transistors 79 connected to control the charging of a firing capacitor 80 in the circuit of a unijunction transistor 81 generally similar to that shown in the Buchanan Pat. 3,337,769. The input transistor 79 is connected to line 27 via a series connected diode and resistor 82. The output of the unijunction circuit 76 in the illustrated embodiment of the invention however, controls the discharging of a capacitor 83 which is connected in series with a resistor 84 directly across the output of the rectifier 76. A silicon controlled rectifier 85 in series with a resistor 86 is connected across the capacitor 83. The output of the unijunction transistor 81 is connected via a signal line 87 to the gate of the controlled rectifier 85. Thus, between the firing periods of the unijunction transistor 81, the capacitor 83 is charged from the rectifier 77. The firing of unijunction transistor 81 fires the controlled rectifier 84 which conducts and discharges capacitor 83, thereby generating a corresponding voltage across the resistor 86. A pair of resistors 88 and 89 are connected in common at one end to the junction of the controlled rectifier 85 and the resistor 86 with the opposite ends connected respectively to the gates of the two controlled rectifiers 22 in the main rectifying unit 2. The cascaded power amplifying circuitry as shown is more fully disclosed in applicant's co-pending application entitled "Controlled Rectifier Arc Welding Supply Having Improved Positive Firing Characteristics" Ser. No. 819,175 which was filed on Apr. 25, 1969 the same day as the present application and is assigned to a common assignee.

In accordance with the present invention, the control unit 15a is connected between the output of the current feedback diode bridge 33 in the slope circuit 32 and the summing resistor or potentiometer 56 which is connected as the input to the summing current feedback amplifier 9. The control unit 15a includes a shunt or bypass transistor 90 connected to remove the input signal if the current rises above a selected level and for a selected time period. The transistor 90 is controlled by a voltage sensing and timing network 91 interconnected between the output of the diode bridge 33 and the transistor 90 to apply a modified input signal proportional to the arc current.

The illustrated bypass transistor 90 is of an NPN variety having its collector 92 connected directly to the one side of the summing resistor 56 and in particular, to the same side as the input potentiometer 62. The emitter 93 of the transistor 90 is connected directly to the ground line 38. When the transistor 90 is biased to conduct fully, it grounds the corresponding side of the summing resistor 56 and thereby inserts a minimum input signal to the summing amplifier 9, which in turn, changes the phase of the firing signals from the firing units 15 such that the controlled rectifiers 22-24 are phased back and produce a minimum output.

The base 95 of transistor 90 is connected through the network 91 to the rectifier bridge 33 to control conduction in accordance with abnormal current as follows. A diode 96 in series with a potentiometer 97 is connected between the positive side of the rectifier bridge 33 and the common reference or ground defined at the junction of the voltage dividing resistors 37 and therefore, in series with the one voltage dividing resistor directly across the output of the rectifier bridge 33. The potentiometer 97 includes a tap 98 providing an adjustable pick-off point for applying various proportions of the current feedback to network 91 and therefore, to the base 95 of the transistor 90. A pair of Zener diodes 99 and 100 are connected in series between the tap 98 and the transistor base 95. The Zener diodes 99 and 100 define voltage sensitive devices which block current until such time as the voltage across the element rises above a selected level. A resistor 101 is connected between the diodes 99 and 100 and a second resistor 102 is connected between the diode 100 and the base 95. Additionally, a timing capacitor 103 is connected between the junction of the resistor 101 and the diode 99 and ground. A discharge capacitor 104 is connected in parallel with the timing capacitor 103.

Under all normal current feedback signals, the voltage appearing at tap 98 is below the Zener voltage of the Zener diode 99. If an abnormal current is established for any reason, the voltage at the tap 98 will rise above the Zener voltage of the diode 99. At this point, the Zener diode 99 will break over and conduct current to and through the timing capacitor 103 at a rate determined by the time constant of the resistor 101 and the capacitor 103. The Zener diode 100 will still isolate the base 95 from the overcurrent voltage. After a selected time, the voltage on the capacitor will rise to the break over voltage of the Zener diode 100 which will then conduct and apply a bias current to the base 95 of transistor 90. The current and voltage will bias the transistor 90 to conduct and thereby connect the corresponding input side of the summing resistor 56 to ground. This, in essence, introduces an apparent zero minimum output current signal to the summing amplifier and the related output signal voltage will provide a corresponding phase back firing signal to the firing circuits. As a result, the firing of the controlled rectifiers 22–24 will be phased back to a minimum firing angle with the resulting minimum output of the power supply.

The time delay introduced by the timing capacitor 103 is selected to eliminate the immediate turn on of the transistor 90 as a result of transient type current signals resulting from high transient currents in the arc circuit. For example, there is always a very high transient current during the starting of the arc. Generally, the current will exist for approximately seven cycles of the power supply. The time delay inserted by the capacitor 103 may be selected at any desired value for example, applicant has found that approximately twenty cycles provides reliable overcurrent protection while eliminating the triggering of the overload circuit as a result of transient starting currents.

In a practical application, the potentiometer was set to establish a 6.2 voltage signal if the output current rose to 800 amperes. The Zener diode 99 was selected to conduct at such voltage and charged the capacitor 103. In one time constant, that is, when the capacitor was charged of 63% of the applied voltage, the Zener diode 100 conducted and applied a cut-off current to the transistor 90.

If the short circuit or extremely minimal load appearing in the output and resulting in the abnormal current is removed, the turn off signal to the transistor 90 is also removed. Zener diodes 99 and 100 then reset and the feedback system automatically returns to the set welding condition without requiring resetting of the supply by the operator or the like.

If the overcurrent condition appears for less than the timing period of the network 91, the capacitor 103 of course, is charged for the related period to a level below the breakdown level of the second Zener diode 100. However, after the transient overcurrent disappears, the capacitor 103 will discharge through the paralleled resistor 104 and thus, reset the timing network.

The illustrated timing and cutoff circuit has been found to provide reliable overcurrent detection with the highly desirable automatic reset and elimination of transient triggering. Thus, the system response is sufficiently rapid to ignore transient signal and thereafter phase back the controlled rectifiers within the operating limits of the supply. Further, automatically resetting after disappearance of a fault current provides a direct and continuing indication of the condition to the welding operator who can determine whether any equipment service or the like is required.

The operation of the illustrated embodiment of the invention shown in FIG. 2 may therefore be briefly summarized as follows.

The main power supply connection is completed through any suitable means to energize the main transformer 1 and thereby establish the alternating current output of the secondary 16, the proportion of which is applied across the lines 3 and 4 in accordance with the firing of the controlled rectifiers 22 through 24 inclusive.

The particular firing point is controlled by the firing of the circuits 26 and in particular, the discharge of the related capacitors 83 which in turn is controlled by producing proper phase control voltage signals at lines 27, 27' and 27''.

The reference input signal is established by proper positioning of the slider 61 on the reference potentiometer 62 with a consequent corresponding voltage applied to one side of the current summing resistor 56. The current feedback signal is established by the windings 28 and 29 of the current sensor, and modified by the slope adjustment potentiometer 41 to apply a corresponding modified current signal to the opposite side of resistor 56. The differential signal across resistor 56 provides a modulating input to transistor 50 of the current feedback differential amplifier 9 such that the output fed to the voltage feedback differential amplifier 12 reflects the desired slope characteristic superimposed upon the desired otherwise constant, output voltage. The differential amplifier 12 similarly compares this signal with the voltage feedback signal at line 13 to apply a proper voltage signal to the firing circuit 26 to produce the necessary phased firing of the controlled rectifiers 22–24 for establishing and maintaining the desired constant output voltage with a selected slope.

If the arc current rises above the selected maximum normal current level for a selected period, the Zener diodes 99 and 100 sequentially breakover and bias transistor 90 to conduct and phase back the firing of the controlled rectifiers 22–24 to establish a minimal current output. If the fault corrects itself the output circuit automatically resets the desired welding condition. If the fault does not correct itself, the minimal current output provides an immediate indication to the operator of a major type fault requiring servicing.

What is claimed is:

1. A direct current arc power supply for establishing and maintaining an arc between a pair of electrode means, comprising power circuit means connected to a pair of output means for connection to the electrode means, current sensing means coupled to the output means to sense the arc current, input signal means, output control means connected to the current sensing means and to the input signal means and connected to the power circuit means to control the output level of the power circuit means to said output means, and an automatic resettable current level control means connected to said current sensing means and said output control means and having means to actuate said output control means to limit the output level of the power circuit means in response to the presence of a selected abnormal arc current.

2. The direct current arc power supply of claim 1 wherein said automatic resettable current level control means including time delay means whereby said selected abnormal arc current includes a minimum amplitude and a minimum period.

3. The direct current arc power supply of claim 1 wherein said current level control means includes an electronic switch means having an input means, and current limit sensing means connected to said current sensing means and to said electronic switch input means to turn on said electronic switch means, and means connecting said electronic switch means to the input signal means to by-pass at least a portion of the set signal and thereby minimize the output.

4. The direct current arc power supply of claim 1 wherein said output control means includes a differential amplifier having a first input means connected to a fixed bias supply and a second input means, a summing resistor connected at one end to the input signal means, and at the opposite end to the current sensing means, and said current level control means including an electronic switch means connected between said one end of the resistor and ground.

5. The direct current arc power supply of claim 1 wherein said current level control means includes a transistor, said transistor to the input signal means to by-pass at least a portion of the set signal and thereby minimize the output, and current limit sensing means including time delay means connected to said current sensing means and to said transistor to turn on said transistor in response to the selected abnormal arc current.

6. The direct current arc power supply of claim 1 wherein said power circuit means includes triggered rectifier means, said control means including means to vary the firing phase of the triggered rectifier means and thereby control the output of the power circuit means, said current level control means being connected to phase back the firing phase and thereby limit the output current for the duration of the selected abnormal arc current.

7. The direct current arc power supply of claim 1 wherein said current level control means includes an electronic switch means connected to by-pass said input signal means, a timing network including a pair of series connected voltage sensitive diode means connected between the electronic switch means and said current sensing means and including a timing capacitor connected between the junction of said diode means and ground.

8. The direct current arc power supply of claim 1 wherein said output control means includes an amplifier raving an input summing resistor, said input signal means including an adjustable potentiometer with a tap means connected to one side of said summing resistor and said current sensing means connected to the second side of the summing resistor, said current level control means including a solid state switching element connected to said one side of said summing resistor and ground, said switching element having an input circuit connected to said current sensing means, an adjustable signal means connected to said current sensing means, said input circuit including a pair of similarly polarized and series connected voltage sensitive switching means connected between the adjustable signal means and said switching element and a timing network connected between the connection of said voltage sensitive switching means and the switching element, said timing network having a period in excess of transient abnormal arc currents.

9. The direct current arc power supply of claim 1 wherein said output control means includes a differential amplifier having a fixed bias supply establishing a selected output and having an input means connected to a summing resistor, said input control means connected to one side of said summing resistor, said current sensing means including an adjustable slope control means connected to the second side of the summing resistor, said current level control means including a transistor connected to said one side of said summing resistor and ground, said transistor having an input circuit connected to said current sensing means to bias the transistor to conduct in response to the selected abnormal arc current, said input circuit including a pair of similarly polarized and series connected voltage sensitive switching means connected between the current sensing means and said transistor and a resistance-capacitance timing network connected between the connection of said voltage sensitive switching means, said timing network having a period in excess of transient current signals associated with initiation of an arc and automatically resetting upon removal of the abnormal arc current.

10. The direct current arc power supply of claim 1 wherein said power circuit means includes a bank of controlled rectifier means, said current sensing means includes current transformer means coupled to the input to the rectifier means, control rectifier means connected to the current transformer means to establish a direct current signal, said output control means including an amplifier having an output means connected to control the firing of the controlled rectifier means, first means selectively connecting said control rectifier means to said amplifier to establish an adjustable current feedback signal, said current level control means including a transistor having an output loop connected between said input signal means and ground and having an input circuit loop, a timing network including a pair of Zener diodes connected in series between the transistor and said control rectifier means and including a timing capacitor and a paralleled resistor connected between the junction of said Zener diodes and ground, one side of said summing resistor means being connected to the current sensing means and the opposite side being connected to the input signal means.

11. The direct current arc power supply of claim 1 wherein said power supply includes a bank of triggered power rectifier means, said output control means includes a differential amplifier having a fixed input means and an adjustable input means, said adjustable input means including a summing resistor having an adjustable tap connected to the amplifier, said current sensing means includes current transformer means coupled to the input to the rectifier means, control rectifier means connected to the current transformer means to establish a direct current signal, first adjustable means selectively connecting said control rectifier means to one side of said resistor to establish an adjustable current feedback signal, said electronic switch means including a transistor having an output loop connected between said input signal means and ground and having an input circuit loop, a potentiometer connected across said control rectifier means and having a movable tap, a timing network including a pair of Zener diodes connected in series between the transistor and said movable tap, a control resistor connected in series between said diodes, a timing capacitor connected in series with said control resistor and a reference potential means, a discharge resistor connected in parallel with said capacitor, the Zener diode connected to said movable tap being selected to conduct in response to a selected amplitude, and said other Zener diode selected to conduct in approximately one time constant of the series connected control resistor and said capacitor.

References Cited

UNITED STATES PATENTS

| 3,337,769 | 8/1967 | Buchanan | 315—142 |
| 3,354,384 | 11/1967 | Benjamin | 321—19X |
| 3,371,242 | 2/1968 | Aldenhoff et al. | 315—142X |
| 3,453,526 | 7/1969 | Bowles | 321—19 |
| 3,461,374 | 8/1969 | Rhyne, Jr. | 321—19X |

WILLIAM M. SHOOP, JR., Primary Examiner

U.S. Cl. X.R.

219—131, 135